United States Patent [19]
Brosnan et al.

[11] Patent Number: 4,889,324
[45] Date of Patent: Dec. 26, 1989

[54] EXOTHERMIC WELDING APPARATUS AND METHOD

[75] Inventors: Denis A. Brosnan, Solon; James E. Whetsel, Bedford; Richard E. Singer, Beachwood; Mark V. Samas, Euclid; Michael D. Amos, Burton; David P. Kovarik, Eastlake, all of Ohio

[73] Assignee: Erico International Corporation, Solon, Ohio

[21] Appl. No.: 128,597

[22] Filed: Dec. 4, 1987

Related U.S. Application Data

[63] Continuation-in-part of Ser. No. 30,169, Mar. 25, 1987, abandoned.

[51] Int. Cl.⁴ .............................................. C21D 1/00
[52] U.S. Cl. ...................................... 266/157; 75/27; 266/144
[58] Field of Search .................. 266/227, 144, 157; 75/27; 164/54; 228/241, 257

[56] References Cited

U.S. PATENT DOCUMENTS

| | | | |
|---|---|---|---|
| 2,569,956 | 10/1951 | Schiltknecht | 75/27 |
| 2,831,760 | 4/1958 | Rejdak | 75/27 |
| 2,870,493 | 1/1959 | Rejdak | 75/27 |
| 3,166,805 | 1/1965 | Fritz et al. | 266/144 |
| 3,926,104 | 12/1975 | El Dorado | 266/144 |

FOREIGN PATENT DOCUMENTS 0324534  4/1903  France ..................... 75/27

OTHER PUBLICATIONS

Astro Met Associates, Inc., Amporox Product Brochure, Nov., 1984.
Pyrofuse Corp. Advertisement, Dec., 1980.
Consolidated Aluminum Product Brochure, Dec., 1980.
Reticulated Vitreous Carbon Product Brochure, Dec., 1976.
Fiberfax Durablanket Advertisement, Nov., 1984.

*Primary Examiner*—S. Kastler
*Attorney, Agent, or Firm*—Renner, Otto, Boisselle & Sklar

[57] ABSTRACT

An improved thermite reaction containment vessel and method of using the same includes a filter assembly which serves to filter the gases evolving from the thermite reaction and reduce the amount of smoke, fume and the like by-products emitted. In one preferred embodiment the filter assembly comprises a primary filter and a secondary filter. An air gap may be provided between the primary and secondary filter so as to provide additional cooling of the gases before they enter the secondary filter. The invention further provides a remote electrical ignition system which is capable of igniting thermite reaction materials without the use of a starting material. The ignition system may include an ignition fuse having an aluminum core and an outer coating comprising palladium and ruthenium or hot wire.

34 Claims, 4 Drawing Sheets

EXOTHERMIC WELDING APPARATUS AND METHOD

DISCLOSURE

This invention relates to exothermic reactions. More particularly, this invention relates to an improved apparatus and method for producing molten metal such as weld metal for joining two or more members utilizing a thermite reaction to produce the molten metal.

This application is a continuation-in-part of application Ser. No. 030,169 entitled "Exothermic Welding Apparatus and Method", filed Mar. 25, 1987, now abandoned.

BACKGROUND

Thermite reactions are highly exothermic reactions. During such reactions initially solid reactants undergo oxidation and reduction processes which liberate heat and form reaction products. Such thermite reaction processes serve various useful purposes. Important applications of the thermite reaction process include the welding of metallic members and the cast forming of metal or ceramic parts. In such applications the thermite reaction is utilized to produce a superheated molten metal to cast a part or produce a weld metal for the welding and joining of the members.

Thermite reactions are generall described as reactions between metal oxides and metallic reducing agents. The metal oxides chosen for the reaction are those which have low heats of formation. The reducing agents chosen for the reaction are those which exhibit oxide species with high heats of formation. The difference in the heat of formation of the reaction product metal oxide and the reactant metal oxide is the heat produced in the reaction. Such reactions are highly exothermic. Thermite reactions of particular interest due to their extensive industrial usage are as follows:

|  | Thermite Reactions | Heat Evolved K cal |
| --- | --- | --- |
| (1) | $3Fe_3O_4 + 8Al = 9Fe + 4Al_2O_3$ | 719 |
| (2) | $3FeO + 2Al = 3Fe + Al_2O_3$ | 187 |
| (3) | $Fe_2O_3 + 2Al = 2Fe + Al_2O_3$ | 181 |
| (4) | $3CuO + 2Al = 3Cu + Al_2O_3$ | 275 |
| (5) | $3Cu_2O + 2Al = 6Cu + Al_2O_3$ | 260 |

In present commercial form the thermite reactions noted above all require local temperatures of approximately 1750° F. in order to be self-propagating (i.e., in order to ignite and continue the reaction to completion). For this reason, starting materials of lowr ignition temperatures (about 850° F.) are placed in direct contact with the thermite reaction materials. Such starting materials may be conveniently ignited with a flint igniter, or other like sparking or ignition device. Upon ignition of the starting material, the starting material serves to ignite the higher temperature ignition point thermite reaction materials.

Thermite reactions are generally conducted in a reaction containment vessel such as a crucible. Upon ignition of the thermite reaction materials significant amounts of hot gases containing smoke and fume evolve from the reaction containment vessel. Such smoke and fume generally includes particulate matter.

SUMMARY OF THE INVENTION

The present invention provides a filter assembly for use in conjunction with a thermite reaction containment vessel. The filter assembly serves to filter the exhaust gases which evolve from the containment vessel upon ignition of the thermite reaction material. Filtering the exhaust gases reduces the amount of smoke, fume and the like by-products emitted.

In a preferred embodiment the filter assembly comprises a primary and a secondary filter. Any one of a variety of materials may be utilized to fabricate the filters. For example, depending upon the particular applicaiton, the primary filter may comprise a permeable refractory material made of vitreous carbons, graphite materials, silicon carbide materials, zirconium oxide fabric or a ceramic coated metal. Additionally, in certain applications metal wool or mesh may function effectively as the primary filter.

The secondary filter may comprise, for example, permeable ceramic fiber mats or blankets, fiberglass mats or spun filter devices, or polymer or natural fiber mats if the exhaust gases have been sufficiently cooled by the primary filter. Selection of the optimum material for the filters will be dependent upon a variety of factors including the specific type and amount of thermite reaction materials being utilized, and the size and configuration of both the containment vessel and the filter assembly.

In another preferred embodiment the invention provides a filter assembly and a baffle assembly having a plurality of graphite disks which form a baffled pathway through which the exhaust gases travel. On top of the baffle is provided the filter assembly which comprises a secondary filter sandwiched between a pair of primary filters. The primary filters preferably comprise graphite felt and the secondary filter preferably comprises a ceramic fiber blanket material.

In yet another preferred embodiment the invention provides a filter assembly comprising a filter holder having a primary filter and a secondary filter. The primary filter preferably comprises graphite felt and the secondary filter preferably comprises a ceramic fiber blanket material. This particular filter assembly is preferably utilized when less than about 150 grams of weld metal are to be formed.

The invention further provides a remote electrical ignition system which is capable of igniting thermite reaction materials without the use of a starting material. The system may include an ignition fuse having an aluminum core and an outer alloy coating or ruthenium and palladium or hot wire.

The foregoing and other features of the invention are hereinafter more fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF PREFERRED EMBODIMENTS

1. Prior Art

Figures 1, 2:
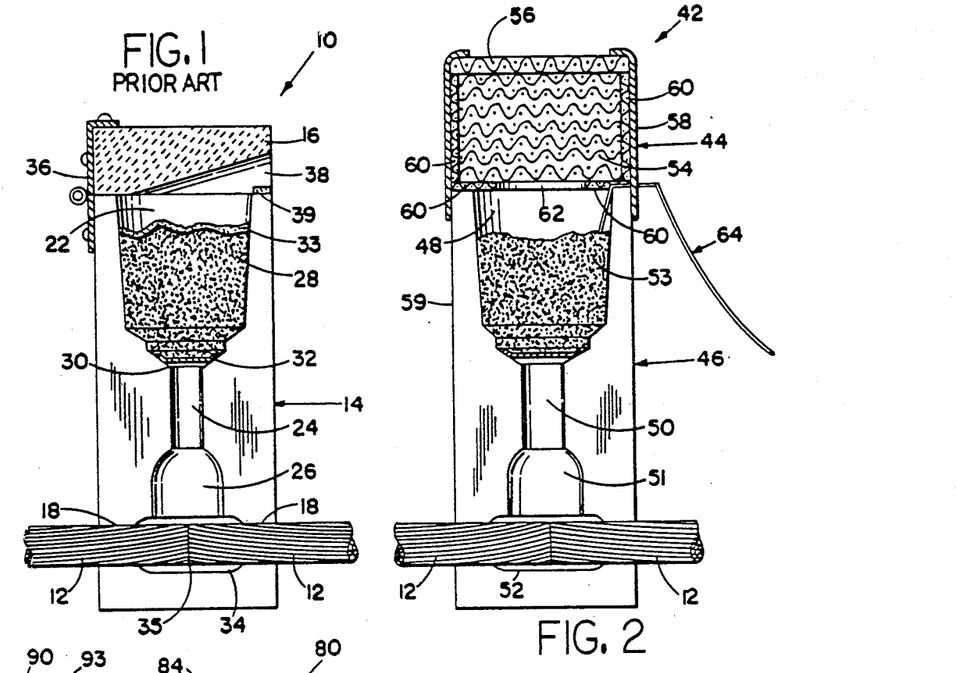
FIG. 1 is an elevated partial cross-sectional view of a prior art thermite reaction containment vessel for producing a weld joining two stranded cables.
FIG. 2 is an elevated partial cross-sectional view of an improved thermite reaction containment vessel for producing a weld joining two stranded cables made in accordance with the present invention.

Referring to FIG. 1 there is illustrated a prior art thermite reaction containment vessel 10. Containment vessel 10 may be constructed of graphite or any other like high temperature refractory material. Containment vessel 10 is representative of prior art vessels which have commonly been employed to produce a weld for joining two or more members such as the illustrated cables 12. Such prior art is exemplified by the well known exothermic welding apparatus and process sold under the trademark CADWELD by Erico Products Inc. of Solon, Ohio, U.S.A., or Erico BV of Tilburg, Holland.

In addition to joining cables 12, it will be appreciated that prior art thermite reaction containment vessels have been utilized to join a variety of members having various compositions including, for example, rods, bars, rebar, rails, and the like.

The containment vessel 10 comprises a pair of bottom sections 14 and a removable cover or top section 16. Only one of the bottom sections 14 has been illustrated, the other bottom section not illustrated being a mirror image of the bottom section 14 shown. The bottom sections 14 are generally held together by a hinge (not shown) or other like fastening or clamping device.

The bottom section 14 includes a pair of openings 18 which are only slightly larger in diameter than the cables 12 which are to be joined. The bottom section 14 also includes a reaction cavity 22, a tap hole passage 24, and a riser cavity 26. Thermite reaction material 28 is retained in the cavity 22 by a metal disk 30 which is positioned at the base or seat 32 of the cavity 22. A thin layer of starting material 33 is provided on top of the reaction material 28. Beneath the riser cavity 26 is a weld chamber 34 in which the abutting ends of the cables 12 are centered. Weld chamber 34 allows the resulting reacted molten metal to completely surround and engulf the ends of the cables 12 and the junction 35.

The top section 16 is attached to the bottom section 14 by a hinge 36. Hinge 36 allows a user to flip the top section 16 up to obtain access to the cavity 22. Such access allows the user to place the disk 30, reaction material 28, and starting material 33 in the cavity 22.

Top section 16 includes an opening 38. Opening 38 provides limited access to the cavity 22 when the top section 16 is positioned upon the bottom section 14 as illustrated. Opening 38 allows a user to ignite the starting material 33 placed on the lip 39 of bottom section 14 which in turn ignites the starting material 33 in the cavity 22. Opening 38 also serves as a chimney for exhausting hot gases and particulate matter which evolve from the cavity 22 upon ignition of the reaction material 28.

The cables 12 are joined by first closing the illustrated bottom section 14 and the bottom section not illustrated upon cables 12. With the top portion 16 in the open position, the disk 30, reaction material 28, and starting material 33 are appropriately placed in the cavity 22 with some starting material on the lip 39 of bottom section 14. The top section 16 is then flipped down into position over the bottom sections 14. A source of ignition is then provided through opening 38. Such ignition source may originate from, for example, a spark provided by a flint igniter or the intense heat provided by an electrical ignition wire. Upon ignition of the starting material 33 the reaction material 28 is ignited. The reaction material 28 produces intense heat, gases, and molten reactants. The gases exit the vessel 10 via opening 38. The molten reactants melt disk 30 and flow through the tap hole passage 24 and into riser cavity 26 and weld chamber 34 surrounding the abutting ends of the cables 12. Once the reaction material 28 has been consumed, the reacted molten metal solidifies forming a connecting weld between the cables 12. The containment vessel 10 may then be removed from the cables 12 by opening or separating the bottom mold sections 14.

2. Present Invention

Referring now to FIG. 2 there is illustrated an improved containment vessel 42 made in accordance with the present invention. Containment vessel 42 provides a distinct advantage over prior art devices for it includes a filter assembly 44. Filter assembly 44 serves to minimize the amount of smoke, fume and the like by-products in the exhaust gases which evolve from the reaction vessel 42.

Like the prior art device, reaction vessel 42 includes the illustrated bottom section 46, and a mirror image bottom section which is not shown. Similarly, bottom section 46 includes a reaction cavity 48, a tap hole passage 50, a riser cavity 51, and a weld chamber 52 which surrounds the abutting ends of the cables 12.

Unlike the prior art containment vessels, containment vessel 42 does not include a cover or top section 16 like that shown in the prior art vessel 10 of FIG. 1. Instead, containment vessel 42 includes the removable filter assembly 44. The function of the filter assembly 44 goes beyond that of merely serving as a top for the bottom sections 46. Specifically, filter assembly 44 serves to remove the smoke, fume and the like from the gases which evolve from cavity 48 upon ignition of the reaction material 53.

Filter assembly 44 comprises a lower primary filter 54 and an upper secondary filter 56. The filters 54 and 56 are held in position over the top of the bottom sections 46 by a metal frame 58. Metal frame 58 firmly engages the otuer walls 59 of the bottom sections 46 so as to provide a secure friction engagement between the bottom sections 46 and the metal frame 58. In addition to the friction engagement shown any one of a variety of additional attachment means, such as, for example, fasteners, clasps, and the like may be utilized to secure the filter assembly 44 upon the sections 46. Partially surrounding the primary filter 54 is compressed gasket material 60. Gasket material 60 seals the filter assembly 44 to the sections 46 and forms an orifice 62 for the transmission of the exhaust gases into the filters 54 and 56. Gasket material 60 may comprise, for example, the same material as the secondary filter 56 yet more compressed.

The present invention may be practiced utilizing filters of various compositions. Additionally, instead of utilizing a pair of filters 54 and 56, this invention contempaltes the use of any number of filters including the use of a single filter. However, it will be appreciated that the use of a single filter may not be very effective in certain applications.

Filters 54 and 56 must be constructed of materials which are permeable enough to avoid pressure build-up in the cavity 48, yet thick and dense enough to filter sufficiently the exhaust gases passing therethrough. Pressure build-up in reaction cavity 48 may cause reaction products to be blown into the weld chamber 52 in such a manner as to produce an unacceptable weld. Depending upon the type of thermite reaction material being employed, the total thickness of filters 54 and 56 may range, for example, from about one-half inch to about four inches.

The primary filter 54 serves to absorb any molten reactants that may splatter upon ignition of the reaction material 53. The primary filter 54 also serves to remove any large particles in the exhaust gases. Additionally, the primary filter 54 provides a surface area for the deposition of any metal oxide materials which may have been vaporized upon ignition of the reaction material 53. The primary filter also presents a tortuous path for the exhaust gases and allows the exhaust gases to cool somewhat before passing through the secondary filter. Thus, the primary filter serves to protect the secondary filter.

Examples of but a few materials which may be utilized to construct the primary filter 54 include, for example, vitreous carbons, graphite materials, silicon carbide materials, zirconium oxide fabric, and ceramic coated metal fabrics. Ceramic filters should be placed at a distance from the reaction material to avoid fusion of the filter surface. Additionally, in certain applications, metal wool or mesh of carbon steel or other metals may be utilized. Such other metals may include stainless steel, non-ferrous alloys such as super alloys, or refractory metals such as molybdenum, tungsten, etc. Higher melting point metals allow for greater durability and/or the positioning of the primary filter 54 closer to the reaction material 53 or starting material. Generally, however, wool or mesh should be placed at a distance away from the reaction material 53 or starting material. Metal wool or mesh is especially well adapted for throw-away applications wherein the filter assembly 44 is not re-used.

An example of a particular material which may be utilized in certain applications for the primary filter 54 is an open cell, porous ceramic material sold under the trademark AMPOREX by Astro Met Associates, Inc., of Cincinnati, Ohio. An example of another material which may be suitable for use in certain applications is a reticulated vitreous carbon sold under the trademark RVC by Energy Research and Generation, Inc., of Oakland, Calif. In certain applications, vitreous carbon and graphite material filtes may be positioned in direct contact with the thermite reaction material 53 or starting material.

The secondary filter 56 serves to collect fine particles and dust which may not be collected by the primary filter 54. Examples of but a few materials which may be acceptable for use in the secondary filter 56 include permeable ceramic fiber mats or blankets, fiberglass mats or spun filter devices, and polymer or natural fiber mats in applications wherein the reaction gases have been sufficiently cooled in the primary filter 54.

An example of a particular material which may be utilized in certian applications for the secondary filter 56 is ceramic fiber blanket material sold under the trademark FIBERFAX DURABLANKET by The Carborundum Company of Niagara Falls, N.Y.

Since filter assembly 44 does not include an opening which provides access to the cavity 48, ignition of the reaction material 53 requires the use of a remote electrical ignition system 64. Ignition system 64 is fed into cavity 48 between the gasket 60 of the filter assembly and the top of the bottom section 46. Ignition system 64 provides a distinct advantage over prior art ignition systems because it does not require the use of a starting material.

Figures 3, 4, 5:
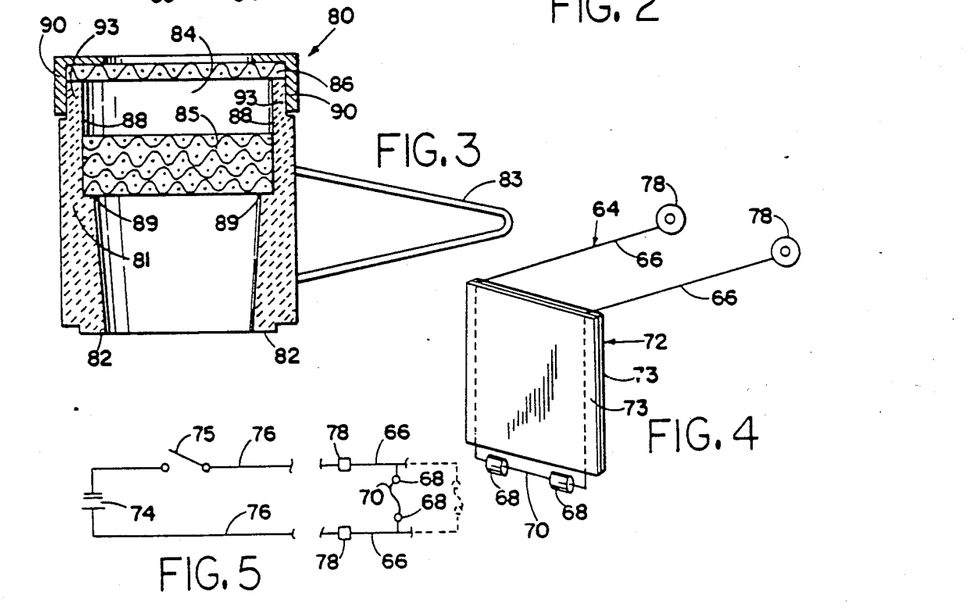
FIG. 3 is an elevated cross-sectional view of an alternative embodiment of a filter assembly made in accordance with the present invention.
FIG. 4 is a perspective view of an ignition device made in accordance with the present invention.
FIG. 5 is a schematic of an electrical circuit for use in conjunction with the ignition device illustrated in FIG. 4.
Figure 6:
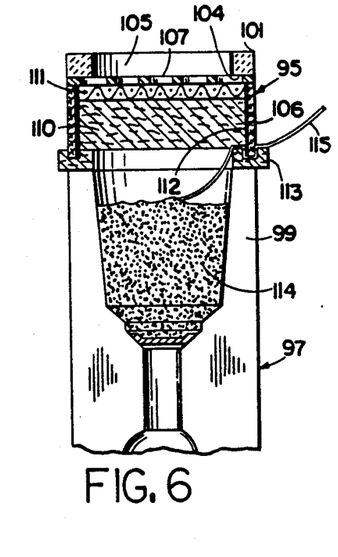
FIG. 6 is a fragmentary elevated cross-sectional view of an alternative embodiment of an improved thermite reaction containment vessel made in accordance with the present invention.
Figure 7:
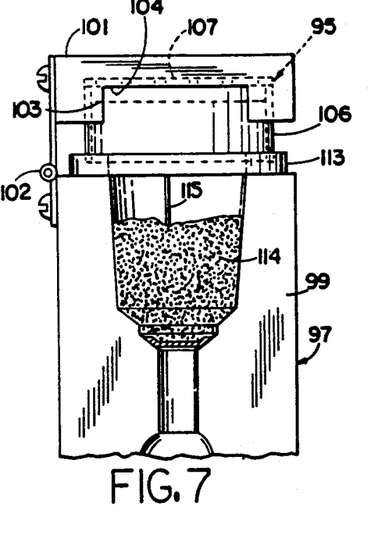
FIG. 7 is a fragmentary side view of the improved thermite reaction containment vessel illustrated in FIG. 6.
Figure 8:
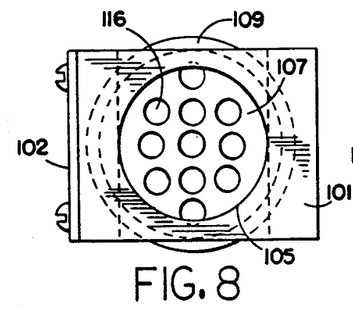
FIG. 8 is a top plan view of the improved thermite reaction containment vessel illustrated in FIG. 6.
Figure 9:
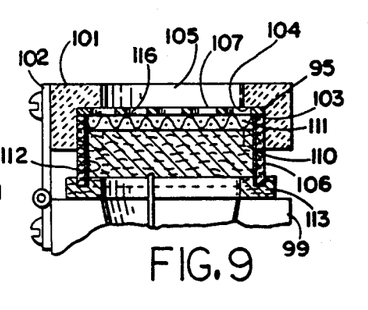
FIG. 9 is another fragmentary elevated cross-sectional view of the improved thermite reaction containment vessel illustrated in FIG. 6.

Referring to FIG. 4, ignition system 64 comprises a pair of leads 66 and a pair of connectors 68 which connect the ends of leads 66 to the ignition fuse or hot wire 70. The ignition device 70 may take a form other than wire, such as, for example, a foil. The ignition device 70 should be placed to a depth of about $\frac{1}{8}$ inch in the reaction material 53. Preferably, as illustrated, ignition system 64 includes a laminated flexible sheet insulator 72 which serves to support and separate the leads 66. Insulator 72 comprises a pair of sheets 73 laminated together with the leads 66 positioned therebetween. As an example, masking tape has been found suitable for use as the sheets 73.

The ignition fuse 70 comprises a core of aluminum wire having an outer alloy coating. The alloy coating comprises palladium and ruthenium. Preferably, the alloy coating comprises about 95% palladium and about 5% ruthenium. Ignition wire 70 is capable of successfully igniting reaction materials of various compositions without the use of a starting material.

An example of an ignition fuse 70 suitable for use with the present invention is a wire sold under the trademark PYROFUZE by Pyrofuse Corp., an affiliate of Sigmund Cohn Corp. of Mount Vernon, N.Y.

Referring to FIG. 5, there is illustrated an electrical schematic for use with the ignition system 64. The schematic illustrates a power source 74 of sufficiently high current output to achieve ignition, such as, for example, a pair of alkaline six volt batteries connected in parallel, a switch 75 for completing the circuit, line wires 76, lead wires 66, junctions 78, a pair of connectors 68, and the ignition fuse or hot wire 70. It will be appreciated that, depending upon the capacity of the power source 74, any number of ignition wires may be placed in parallel with the ignition wire 70 as illustrated in FIG. 5 in phantom. Such additional ignition wires may be used in conjunction with separate containment vessels or within the same containment vessel, for example, when a large amount of reaction material or a slow burning reaction material is employed.

Although the filter assembly 44 has been illustrated in FIG. 2 in conjunction with remote ignition system 64 which does not require a starting material, it will be appreciated that filter assembly 44 and other filtering systems made in accordance with the present invention may also be used with ignition systems that use starting materials.

Referring now to FIG. 3, there is illustrated an alternative embodiment of a filter assembly 80 made in accordance with the present invention. Filter assembly 80 is adapted to be placed upon, for example, a thermite reaction containment vessel which is specifically adapted for joining iron rebar. Filter assembly 80 comprises a housing 81 which may be constructed of the same material as the containment vessel it is used in conjunction with, such as, for example, graphite. Housing 81 includes a protruding bottom rim 82 which engages the inner wall of the reaction cavity of the containment vessel when the filter assembly 80 is placed on top of such containment vessel. This engagement provides a tight seal between the filter assembly 80 and the containment vesel. The engagement between the containment vessel and the filter assembly 80 may be further secured by application of a suitable clamping or fastening device. Filter assembly 80 also includes a handle 83 to facilitate the placement of the filter assembly 80 upon such containment vessel.

Filter assembly 80 provides an air gap 84 between the primary filter 85 and the secondary filter 86. Air gap 84 may range from about one-half inch to about three inches in vertical dimension. Primary filter 85 fits directly within the housing 81. A friction fit is provided between the inner walls 88 of housing 81 and the primary filter 85. Seat 89 limits the depth to which the primary filter 85 may be inserted in the housing 81. The secondary filter 86 is located at the top end of the housing 81 and is held in position by a metal ring 90 which frictionally engages the protruding top rim 93 of the housing 81.

Referring now to FIGS. 6-9, there is illustrated yet another embodiment of a filter assembly 95 made in accordance with the present invention. Filter assembly 95 is adapted for use with a thermite reaction containment vessel 97 having a graphite bottom section 99 and a flip-up lid 101 which may be attached thereto by a spring loaded hinge assembly 102. Hinge assembly 102 allows lid 101 to be flipped up and down, and it exerts a downward force when lid 101 is in the closed or flipped down position. Filter assembly 95 is located in lid 101 and frictionally fits in annular recess 103 against the shoulder 104 in alignment with top hole 105 and is positioned on top of 99 and is held in position by the lid 101 when the lid 101 is flipped down.

Filter assembly 95 comprises a housing 106 and a perforated metal top 107 which surrounds and contains the larger lower primary filter 110 and the smaller upper secondary filter 111. Preferably, housing 106 is constructed of a section of cardboard tubing and includes an interior metal or aluminum foil lining seen at 112 to resist heat degradation of the cardboard. To ensure a tight seal between the filter assembly 95 and the containment vessel 97, the filter assembly 95 includes a seal 113 secured at its base. Preferably, seal 113 is constructed of compressed filter material, such as, for example, such compressed FIBERFAX DURABLANKET material.

Upon ignition of the thermite reaction material 114 by fuse 115, the smoke, fume and the like by-products emitted pass through and are filtered by the primary filter 110 and then the secondary filter 111. The filtered gases then pass through the holes 116 in the perforated metal top 107 and out the top hole 105 in lid 101.

Figure 10:
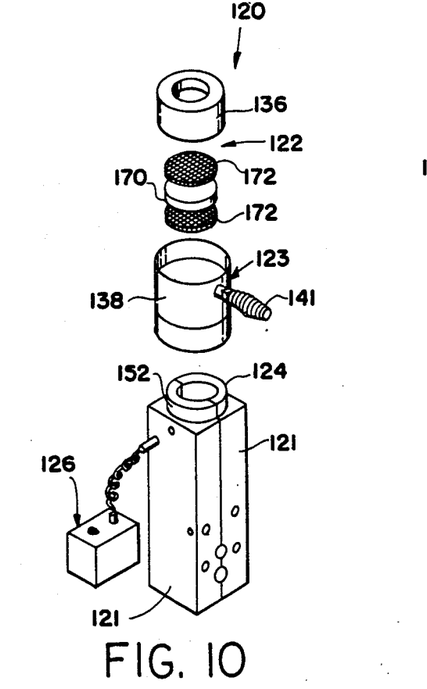
FIG. 10 is a partially exploded perspective plan view of a thermite reaction containment vessel having an improved filter assembly made in accordance with the present invention.

Referring now to FIGS. 10-13, and initially to FIG. 10, there is illustrated an improved thermite reaction containment vessel apparatus shown generally at 120 which includes bottom or crucible sections 121 and a filter assembly 122 and baffle assembly 123 for filtering the gases which evolve from the bottom sections 121 of the containment vessel. Filter assembly 122 is adapted to sit upon and engage baffle assembly 123 which in turn is adapted to sit upon and engage the rim 124 protruding from the top of the sections 120. Bottom sections 121 are preferably constructed of graphite and are essentially identical to the bottom sections of the previously illustrated embodiments. The apparatus is preferably utilized with a remote ignition device such as the illustrated electrical starting system 126. Remote ignition is preferred since filter assembly 122 and baffle assembly 123 considerably restrict access to the inside of the bottom sections 121 thereby preventing the use of a flint igniter.

Figure 11:
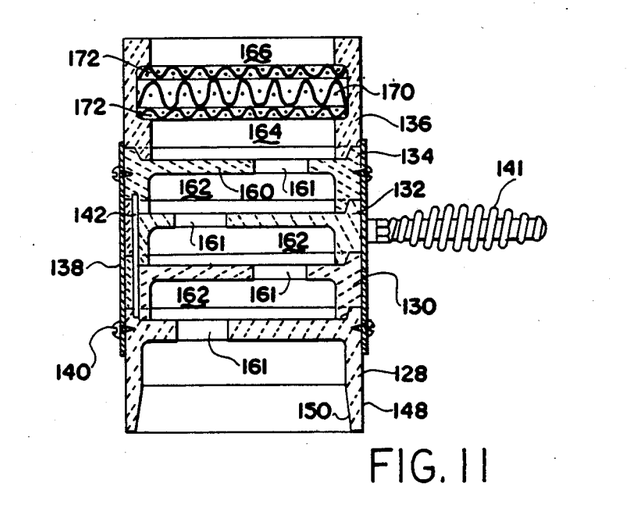
FIG. 11 is an enlarged vertical section of the filter and baffle assembly illustrated in FIG. 10.
Figure 12:
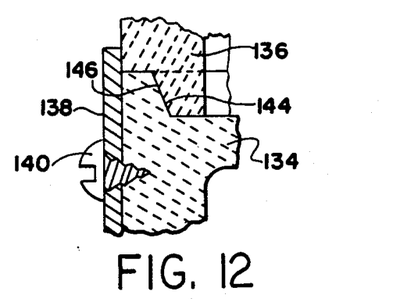
FIG. 12 is an enlarged fragmentary section of the top of the baffle assembly.
Figure 13:
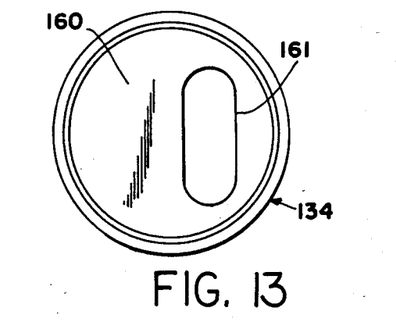
FIG. 13 is a top plan view of one of the disks of the baffle assembly illustrated in FIG. 11.

Referring additionally to FIGS. 11-13, the baffle assembly 123 is constructed of multiple disks 128, 130, 132, 134, the latter supporting a filter holder 136. The disks 128, 130, 132, 134 and filter holder 136 are preferably constructed of graphite. Surrounding and securing the disks together is a metal sleeve 138 having multiple fasteners 140 engaging as illustrated respective disks. Attached to the sleeve 138 is a spring handle assembly 141 which facilitates the removal and placement of the assembly 123 upon the containment vessel 120.

The baffle assembly 123 also preferably includes a metal rod 142 which extends through the disks and serves to facilitate alignment and assembly and further secure the disks in position within the sleeve 138. As illustrated in FIG. 12, the base of the disks and filter holder 136 preferably include mating tapered rims along their respective top and bottom surfaces which include inclined walls 144 and 146 which extend at a slight taper of approximately three degrees from the vertical. Similarly, the extended skirt 148 of bottom disk 128 includes an inner wall 150 having a slight taper of about three degrees so as to facilitate proper mating engagement with rim 124 protruding from the top of the bottom sections 121 which also includes an exterior wall 152 having a mating taper. In this manner the filter assembly 122 may be assembled with the baffle assembly 123 which in turn may be assembled with the bottom sections 121 in a tight wedge frictional fit. For disassembly relative rotation will release the assemblies. The illustrated three degree taper has been found to be very effective in facilitating such release.

Each of the disks, such as disk 134 shown in FIG. 13, includes a horizontal wall 160 and offset elongated opening 161. The elongated chordal opening 161 is offset from a diameter or center of the disk. This allows the disks to be stacked or positioned in the manner shown in FIG. 11 such that the openings 161 are offset 180° from each other. The holes through which the rod 142 passes are of course also offset to facilitate proper assembly. Stacking the disks in this manner results in the formation of multiple chambers 162 and a baffled or staggered path through which the exhaust gases emanating from the containment vessel must travel. This baffled pathway promotes the expansion and cooling of the exhaust gases and the removal of particulate matter contained therein. Thus, the gases are slowed down and cooled after they pass through the baffle assembly 123 and the filters contained in the filter holder 136 are then able to function more effectively.

The filter holder 136 includes a circular bottom opening 164 along its base and a circular top opening 166. Disposed between the openings 164 and 166 is a circular slightly enlarged chamber 168 in which the filters are positioned. Specifically, positioned therein is a secondary filter 170 sandwiched between a pair of primary filters 172. Preferably, primary filters 172 comprise a graphite felt. More particularly, preferably primary filters 172 comprise WDF graphite felt. Preferably, the secondary filter 170 comprises a ceramic fiber blanket material such as that sold under the trademark FIBERFAX DURABLANKET. As a specific example the graphite felt filter layers 172 may be on the order of one quarter inch in thickness while the layer 170 is slightly thicker. The bottom layer 172 protects the layer 170 from splatter and heat degradation while the top layer 172 acts as a containment for the layer 170. This combination of filter materials and baffle have been found to be very effective. Filters 170 and 172 are generally reusable and depending upon the particular application they may be used to perform about four cycles or ignitions of the containment vessel. Filters 170 and 172 are easily replaced by removing them from the chamber 168 of the holder 126 and inserting new filters therein. After several cycles the baffle assembly 123 may be easily disassembled and cleaned with a suitable solvent.

Figure 14:
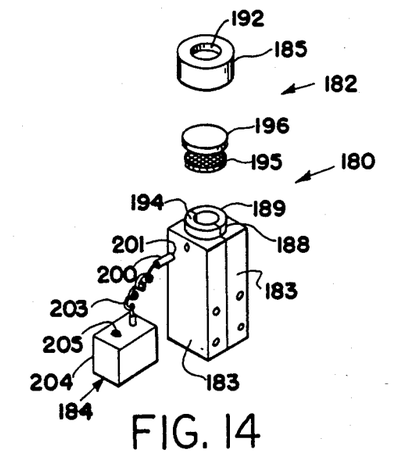
FIG. 14 is a partially exploded perspective plan view of another thermite reaction containment vessel made in accordance with the present invention.
Figure 15:
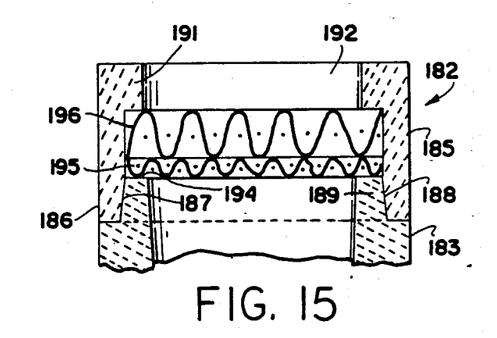
FIG. 15 is a fragmentary cross-sectional view of the filter assembly on the top portion of the containment vessel illustrated in FIG. 14.
Figure 16:
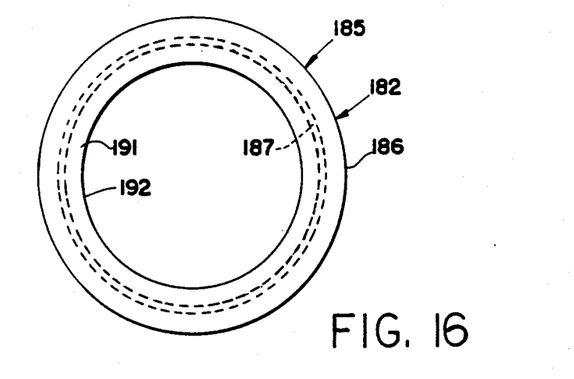
FIG. 16 is a top plan view of the filter assembly as seen from the top of FIG. 15.

Referring now to FIGS. 14-16 there is illustrated yet another improved thermite reaction containment vessel 180 made in accordance with the present invention having a filter assembly 182 for filtering gases which evolve from the bottom or crucible sections 183 of the containment vessel. As with the previously illustrated embodiment, containment vessel 180 employs a remote source of ignition such as an electrical starting system 184 because filter assembly 182 also restricts access to the inside of the bottom sections 183. Filter assembly 182 comprises a filter holder or retainer 185 which sits upon the top of the bottom sections 183 and includes a skirt 186 with a slight taper and an interior surface 187 which engages the exterior taper surface 188 of the rim 189. Filter holder 185 includes a top inwardly directed flange 191 which forms a circular opening 192. The flange 191 cooperates with the top 194 of rim 189 to contain filters 195 and 196. Primary filter 195 preferably comprises a graphite felt such as one-quarter inch WDF graphite felt. Graphite felt has been found to resist the adhesion of molten reactants or reacted molten metal that may splatter onto the bottom of the primary filter 195 from the reaction cavity in the bottom sections 183. Secondary filter 196 preferably comprises a ceramic fiber blanket material such as that sold under the trademark FIBERFAX DURABLANKET. This combination of filter materials has been found to be very effective for use with thermite reactions when about 150 grams or less of weld metal are to be formed. In the embodiment of FIGS. 10-13 more of such weld metal would normally be produced.

Again the angle of the wedge taper surfaces 187 and 188 may be on the order of about a three degree taper which forms a tight connection but which may be separated by relative rotation. Filters 195 and 196 are generally reusable and depending upon the particular application they may be used to perform about four cycles or ignitions of the containment vessel 182. Filters 195 and 196 are easily replaced by removing them from the holder 185 and inserting new filters therein.

In both FIGS. 10 and 14 the electrical starting system may include an igniter 200 which is inserted through hole 201 in the top of the containment vessel. Since the igniter 200 includes a wire which vaporizes on ignition and creates sparks which fall to the weld metal, the igniter does not necessarily have to be buried in the weld metal. The igniter again may be of the wire type sold under the trademark PYROFUSE. After the igniter 200 is in position, with the containment vessel closed, the leads 203 are connected to the battery 204 and the battery is safely positioned from the containment vessel. The button 205 is then depressed and held to start the reaction.

It will be appreciated that although the filter assemblies made in accordance with the present invention and described above have been discussed in conjunction with a thermite reaction containment vessel for producing welds or joining rebar, a filter assembly made in accordance with the present invention may also be used in conjunction with any one of a variety of vessels for containing thermite reactions for various applications such as the cast forming of various exotic materials.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the following claims.

What is claimed is:

1. A thermite reaction containment vessel for reacting thermite reaction material therein which upon ignition produces molten metal and evolves spatter, hot gases, hot particulate matter, and radiated heat comprising filter means for containing such radiated heat and collecting such spatter and particulate matter while allowing such hot gases to exit said containment vessel, said filter means comprising a primary filter of one material and a secondary filter of another material, said primary filter being positioned between the thermite reaction material and said secondary filter to protect said secondary filter from the heat and spatter of the reaction.

2. A containment vessel as set forth in claim 1 wherein said primary and said secondary filter are separated by an air gap.

3. A containment vessel as set forth in claim 1 wherein said primary filter and said secondary filter are contiguous with one another.

4. A containment vessel as set forth in claim 1 wherein said primary filter comprises a permeable refractory material.

5. A containment vessel as set forth in claim 1 wherein said primary filter comprises a permeable refractory filter of sufficient thickness to allow cooling of such gases.

6. A containment vessel as set forth in claim 5 wherein said permeable refractory filter comprises a permeable ceramic material.

7. A containment vessel as set forth in claim 6 wherein said permeable ceramic material comprises a carbide.

8. A containment vessel as set forth in claim 6 wherein said permeable ceramic material comprises carbon or graphite.

9. A containment vessel as set forth in claim 1 wherein said primary filter material comprises metal mesh or metal wool.

10. A containment vessel as set forth in claim 1 wherein said secondary filter comprises fiberglass.

11. A containment vessel as set forth in calim 1 wherein said secondary filter comprises ceramic fiber.

12. A containment vessel as set forth in claim 1 wherein said secondary filter comprises a natural fiber.

13. A containment vessel as set forth in claim 1 wherein said secondary filter comprises a polymer.

14. A containment vessel as set forth in claim 2 further including a bottom section for containing the thermite reaction material, said filter means being removable from said bottom section.

15. A containment vessel as set forth in claim 1 further including a remote electrical ignition system capable of igniting said thermite reaction material without the use of a starting material.

16. A containment vessel as set forth in claim 15 wherein said remote electrical ignition system includes an ignition fuse with an aluminum core.

17. A containment vessel as set forth in claim 16 wherein said ignition fuse includes an outer coating which comprises palladium and ruthenium.

18. A containment vessel as set forth in claim 17 wherein said outer coating of said ignition fuse comprises about 95% palladium and about 5% ruthenium.

19. A filter assembly for use in conjunction with a thermite reaction containment vessel having filter means for filtering particulate matter and allowing the gases to evolve from such containment vessel, said filter means comprising a high temperature resistant primary filter and a secondary filter of different material, said gases passing first through said high temperature resistant primary filter and then said secondary filter, whereby said secondary filter is protected by said primary filter.

20. A filter assembly as set forth in claim 19 comprising a housing for said filter means which is adapted to be placed on top of such thermite reaction containment vessel.

21. A filter assembly as set forth in claim 19 wherein said primary filter and said secondary filter are separated by an air gap.

22. A filter assembly as set forth in claim 19 wherein said primary filter comprises metal wool or metal mesh.

23. A filter assembly as set forth in claim 19 wherein said primary filter comprises vitreous carbon.

24. A filter assembly as set forth in claim 19 wherein said primary filter comprises a permeable refractory.

25. A filter assembly as set forth in claim 19 wherein said primary filter comprises a ceramic.

26. A filter assembly as set forth in claim 19 wherein said secondary filter comprises fiberglass.

27. A filter assembly as set forth in claim 19 wherein said secondary filter comprises a permeable ceramic.

28. A filter assembly as set forth in claim 19 wherein said secondary filter comprises a polymer.

29. A method of conducting a thermite reaction in a containment vessel comprising the steps of loading thermite reaction material into such containment vessel, loading a starting material into such containment vessel, placing a remote ignition system in such reaction material, installing a filter assembly upon such containment vessel, said filter assembly comprising a primary filter of one material and secondary filter of another material with the primary filter being positioned between the vessel and the secondary filter to protect said secondary filter from the heat of the reaction, and igniting such reaction material in such containment vessel.

30. A thermite reaction containment vessel for reacting thermite reaction material therein which upon ignition produces molten metal and evolves particulate matter, spatter, radiated heat and hot gases comprising a bottom section and a flip-up lid attached thereto, said lid having a filter assembly disposed therein for containing such particulate matter, spatter and radiated heat while allowing such hot gases to evolve, whereby when said lid is flipped down the filter assembly is positioned upon said bottom section, said filter assembly comprising a primary filter of one material and secondary filter of another material with the primary filter being positioned between the vessel and the secondary filter to protect said secondary filter from the heat and spatter of the reaction.

31. A containment vessel as set forth in claim 30 wherein said primary filter and said secondary filter are contiguous.

32. A thermite reaction containment vessel for reacting thermite reaction material therein which upon ignition produces molten metal and evolves spatter, particulate matter and hot gases, comprising filter means for filtering such spatter and particulate matter while allowing such hot gases to evolve as such hot gases exit said containment vessel, said filter means comprising a primary filter of a high temperature resistant material and a secondary filter of a lower temperature resistant material with the primary filter being positioned between the thermite reaction material and the secondary filter to protect said secondary filter from the heat and spatter of the reaction.

33. A containment vessel as set forth in claim 32 wherein said primary filter comprises graphite felt.

34. A containment vessel as set forth in claim 33 wherein said secondary filter comprises a ceramic fiber blanket material.

* * * * *